J. P. HALE.
Heating and Evaporating Apparatus.
No. 13,987. Patented Dec. 25, 1855.
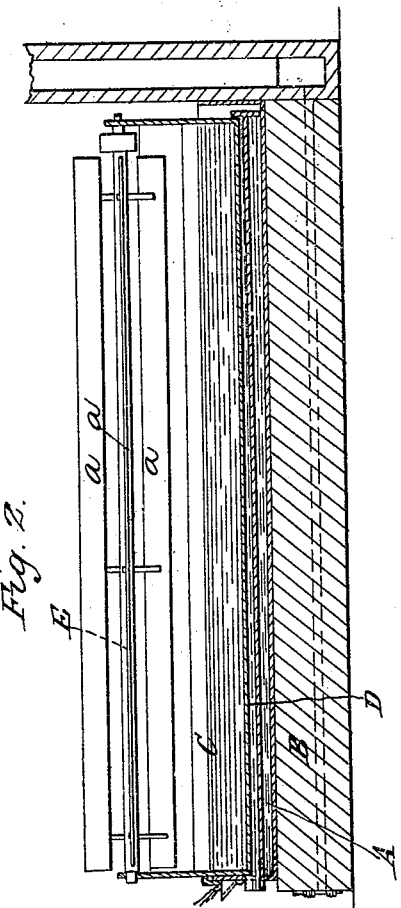
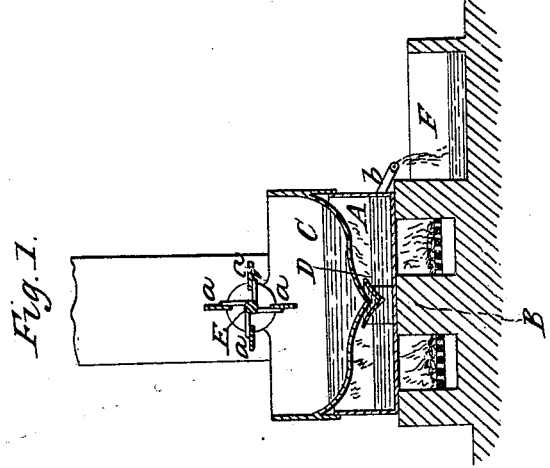

UNITED STATES PATENT OFFICE.

JNO. P. HALE, OF KANAWHA, VIRGINIA.

IMPROVEMENT IN APPARATUS FOR MAKING SALT.

Specification forming part of Letters Patent No. 13,987, dated December 25, 1855.

*To all whom it may concern:*

Be it known that I, JOHN P. HALE, of Kanawha Court-House, in the county of Kanawha and State of Virginia, have invented a new and improved heating and evaporating apparatus, to be used in the manufacture of salt and other substances obtained by evaporation from saturated liquids; and I do hereby declare that the following is a full, clear, and exact description of the same, reference being had to the annexed drawings, making a part of this specification, in which—

Figure 1 is a transverse vertical section of my improvement. Fig. 2 is a longitudinal vertical section of the same.

Similar letters of reference indicate corresponding parts in the two figures.

To enable those skilled in the art to make and use my invention, I will proceed to describe its construction and operation.

The following description pertains to the manufacture of salt by my improved apparatus.

A represents a pan or kettle constructed of metal—cast-iron—and of any suitable dimensions. This pan or kettle is secured over a furnace, B, constructed of masonry.

C represents a pan or kettle, which is fitted within the pan or kettle A, a suitable space being allowed between the bottom of the kettle C and the bottom of the kettle A.

In the pan or kettle A there is placed a longitudinal trough, D, which is slightly inclined, the back end being rather higher than the front end. The pan or kettle C may be constructed of sheet-copper, and its bottom may be curved, as shown in Fig. 1, the center of the bottom being directly over the trough D. The upper part of the pan or kettle C has a longitudinal shaft, E, fitted in it, which shaft has radial arms attached to it, said arms having beaters *a* secured to their ends, the beaters extending the whole length of the shaft. The pan or kettle A has a tube, *b*, communicating with it at one end, and projecting over a vat, F, adjoining the furnace B, as shown in Fig. 1. The front end of the pan or kettle A has an opening, *c*, at its front end, as shown in Fig. 2. The water or brine from the wells is poured into the lower kettle, A, and by means of the fire in the furnace B is reduced to nearly the point of saturation. The water or brine is then drawn from the kettle A by means of the tube *b* into the vat F, where it remains until the impurities which it may contain—such as oxide of iron, gypsum, &c.—have settled to the bottom. The pure brine is then pumped up from the vat F into the upper pan or kettle, C. The upper kettle is heated by the steam from the lower kettle, A, which steam, as it condenses upon the bottom of the kettle C, falls into the trough D, the condensed steam falling from the depressed end of the trough. The brine in the pan or kettle C is agitated by the beaters *a*, which causes a greater evaporating-surface to be exposed to the atmosphere, and the salt, as the water evaporates, granulates in the pan or kettle C, from which it is lifted in any proper manner.

By the above improvement the pan or kettles are prevented from being cracked or broken, as the lower kettle is always supplied with brine, and the brine in the upper kettle cannot be heated higher than 212°. Consequently the salt will not be burned, colored, or injured. At present the brine is boiled and the water evaporated in one set of kettles, and the salt, in consequence of the intense heat, is burned, its color injured, and also its quality. The salt and other mineral ingredients of the brine adhere to the inner surface of the kettle or "cake" as it is termed. This cake is impervious to the brine, and prevents its contact with the kettle, and, being a bad conductor of heat, retards very much the evaporation of the brine, and the brine, not being in direct contact with the kettle, cannot protect it from excessive heat, and it is therefore liable to break from expansion and contraction. Again, it requires considerable time and labor to cut up and remove the cake from the kettle as it is constantly accumulating. By my improvement the above difficulties are obviated, and there is no loss of time or waste of fuel during the process of manufacture.

If desired, the bottom of the upper pan or kettle, C, may be immersed in the brine of the lower pan or kettle, A, no space being allowed between, so that the brine in the upper pan or kettle will be heated by the brine in the lower one, instead of the steam arising therefrom.

I do not claim the process of manufacture herein described irrespective of the means employed for carrying out the process.

What I claim therefore as new, and desire to secure by Letters Patent, is—

The two pans or kettle A C, placed one over the other on a furnace, B, in combination with the vat F, the above parts being arranged as shown, for the purpose specified.

J. P. HALE.

Witnesses:
 JOS. GEO. MASON,
 WM. TUSCH.